US012776069B2

(12) United States Patent
Kinoshita et al.

(10) Patent No.: US 12,776,069 B2
(45) Date of Patent: Oct. 27, 2026

(54) IMAGE PROCESSING APPARATUS, METHOD AND PROGRAM DETERMINING LIGHTING STATE OF TRAFFIC LIGHT USING COLOR PATTERN FILTERS HAVING DIFFRENT SPATIAL INTERVALS BETWEEN COLOR DETECTORS

(71) Applicant: DENSO TEN Limited, Kobe (JP)

(72) Inventors: Shota Kinoshita, Kobe (JP); Naoshi Kakita, Kobe (JP); Takashi Kono, Kobe (JP); Yuki Matsumoto, Kobe (JP); Yasutaka Nishijima, Kobe (JP)

(73) Assignee: DENSO TEN Limited, Kobe (JP)

( * ) Notice: Subject to any disclaimer, the term of this patent is extended or adjusted under 35 U.S.C. 154(b) by 329 days.

(21) Appl. No.: 18/585,116

(22) Filed: Feb. 23, 2024

(65) Prior Publication Data

US 2024/0312063 A1 Sep. 19, 2024

(30) Foreign Application Priority Data

Mar. 15, 2023 (JP) ................................ 2023-040498

(51) Int. Cl.

| | |
|---|---|
| ***G06V 10/56*** | (2022.01) |
| ***G06T 7/90*** | (2017.01) |
| ***G06V 10/77*** | (2022.01) |
| ***G06V 20/58*** | (2022.01) |

(52) U.S. Cl.

CPC ................ *G06T 7/90* (2017.01); *G06V 10/56* (2022.01); *G06V 10/7715* (2022.01); *G06V 20/584* (2022.01)

(58) Field of Classification Search

CPC ........ G06T 7/90; G06V 10/56; G06V 20/584; G06V 10/7715

See application file for complete search history.

(56) References Cited

FOREIGN PATENT DOCUMENTS

JP 2007004256 A * 1/2007

OTHER PUBLICATIONS

Hirabayashi, Manato, et al. "Traffic light recognition using high-definition map features." Robotics and Autonomous Systems 111 ( Year: 2019).*

De Charette, Raoul, and Fawzi Nashashibi. "Real time visual traffic lights recognition based on spot light detection and adaptive traffic lights templates." IEEE (Year: 2009).*

* cited by examiner

*Primary Examiner* — Oneal R Mistry
*Assistant Examiner* — Nhut Huy Pham
(74) *Attorney, Agent, or Firm* — Oliff PLC

(57) ABSTRACT

An image processing apparatus includes a controller that determines a light color of a traffic light from a camera image. The controller is configured to: (i) perform image recognition of the camera image to identify a signal region in which the traffic light exists in the camera image; (ii) set a plurality of different spatial intervals between detectors that detect pixels in the signal region having respective color components of respective lights included in the traffic light; (iii) generate a plurality of feature maps indicating a feature amount for an arrangement pattern of each of the respective color components based on detections of the signal region by the detectors using the plurality of different spatial intervals; and (iv) determine the light color of the traffic light based on the plurality of feature maps.

15 Claims, 11 Drawing Sheets

IMAGE PROCESSING APPARATUS, METHOD AND PROGRAM DETERMINING LIGHTING STATE OF TRAFFIC LIGHT USING COLOR PATTERN FILTERS HAVING DIFFRENT SPATIAL INTERVALS BETWEEN COLOR DETECTORS

BACKGROUND OF THE INVENTION

Field of the Invention

The invention relates to an image processing apparatus, an image processing method and a non-transitory computer-readable recording medium.

Description of the Background Art

Conventionally, a technology that detects a traffic light and a light color of the traffic light by template matching for a camera image from a vehicle has been proposed (for example, refer to the Japanese Published Unexamined Patent Application No. 2007-004256).

In this technology, the traffic light is detected from the camera image while adjusting a size of a template based on a distance between the vehicle and the traffic light in front of the vehicle extracted from a map database. Furthermore, this technology detects a color of a lighting device corresponding to a region with the highest luminance level among three circular regions in the detected traffic light as the light color.

However, in the conventional technology described above, only the luminance levels of the three circular regions are compared to determine the light color. Thus, when using the conventional technology described above, there is a risk that the light color of the traffic light may be erroneously detected if the region corresponding to the lighting device that is not tuned on is determined to have the highest luminance level due to strong sunshine, illuminations or strong-reflecting objects around the traffic light, or external disturbance.

SUMMARY OF THE INVENTION

According to one aspect of the invention, an image processing apparatus includes a controller that determines a light color of a traffic light from a camera image. The controller is configured to: (i) perform image recognition of the camera image to identify a signal region in which the traffic light exists in the camera image; (ii) set a plurality of different spatial intervals between detectors that detect pixels in the signal region having respective color components of respective lights included in the traffic light; (iii) generate a plurality of feature maps indicating a feature amount for an arrangement pattern of each of the respective color components based on detections of the signal region by the detectors using the plurality of different spatial intervals; and (iv) determine the light color of the traffic light based on the plurality of feature maps.

It is an object of the invention to provide an image processing apparatus, an image processing method and a non-transitory computer-readable recording medium capable of improving a detection accuracy of a light color of a traffic light.

These and other objects, features, aspects and advantages of the invention will become more apparent from the following detailed description of the invention when taken in conjunction with the accompanying drawings.

DESCRIPTION OF THE EMBODIMENTS

An embodiment of an image processing apparatus, an image processing method, and a non-transitory computer-readable recording medium disclosed in the present application will be described in detail below with reference to the accompanying drawings. This invention is not limited to the embodiment described below.

In the following, it is assumed that an image processing apparatus 10 according to the embodiment is an in-vehicle apparatus to be mounted in a vehicle. The image processing apparatus 10 is provided to detect a state of an object in an image consisting of a plurality of pixels by image recognition of a camera image. In this embodiment, it is assumed that the object to be detected is a traffic light 300. Furthermore, it is assumed that the state of the object to be detected is a lighting state of the traffic light 300. The lighting state refers to one of a green lighting state, a yellow lighting state, a red lighting state and a non-lighting state of the traffic light 300.

Hereinafter, the expression "prescribed" may be replaced with "predetermined".

Figure 1:
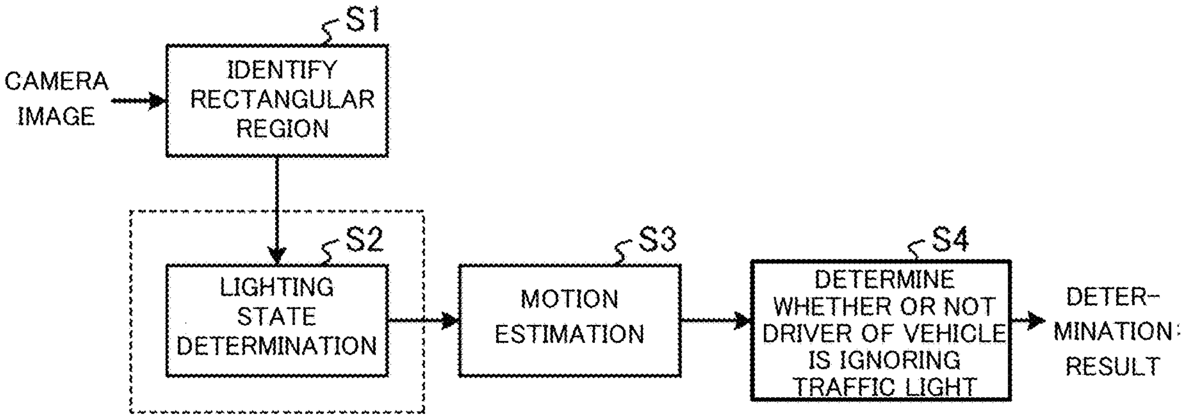
FIG. 1 is a schematic explanatory diagram (No. 1) of an image processing method according to an embodiment.
Figure 2:
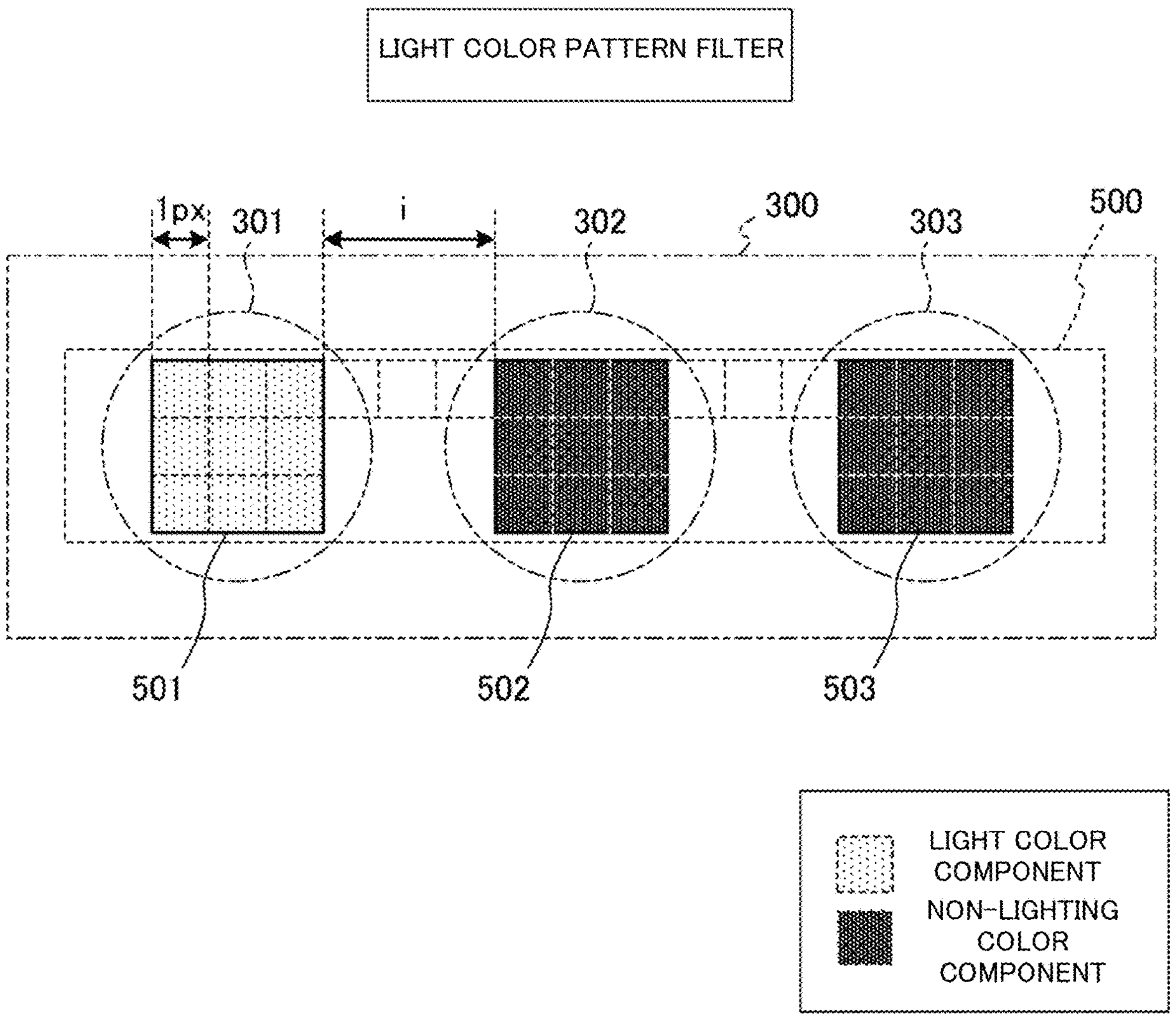
FIG. 2 illustrates a configuration example of a light color pattern filter according to an embodiment.
Figure 3:
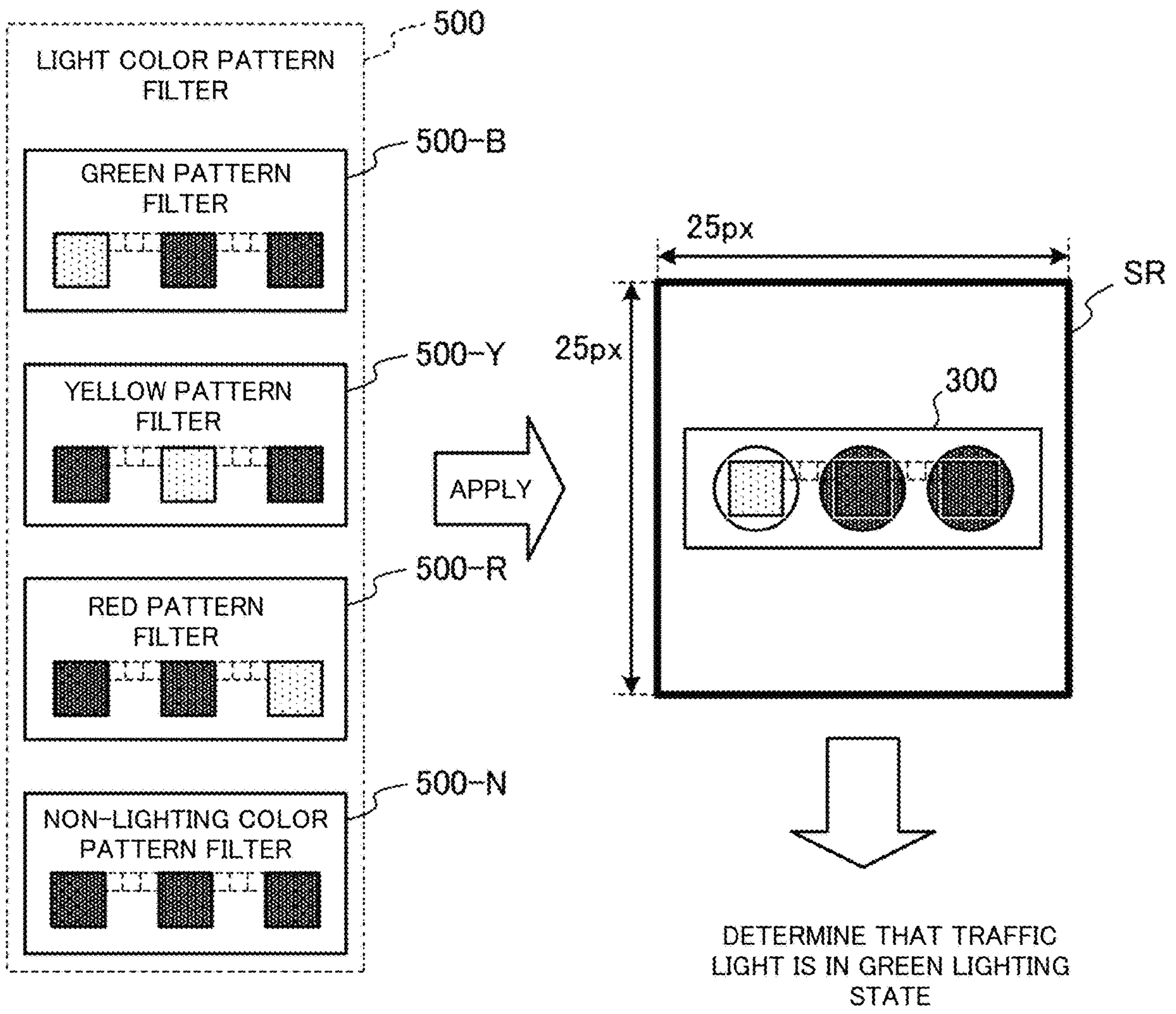
FIG. 3 is a schematic explanatory diagram (No. 2) of the image processing method according to the embodiment.
Figure 4:
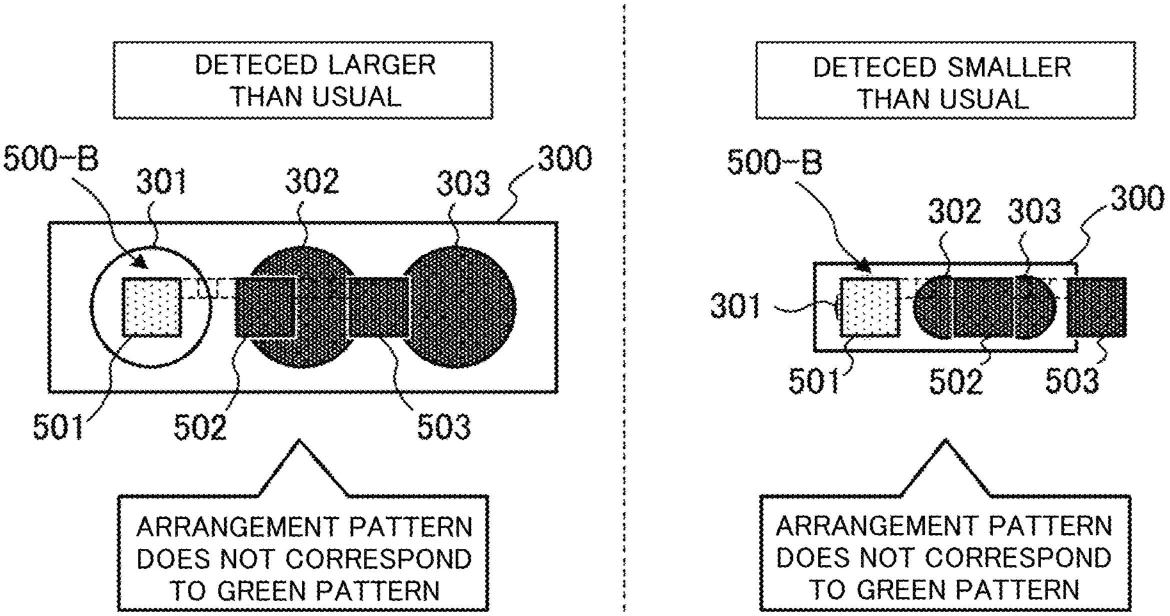
FIG. 4 is an explanatory diagram in a case where a light color may be erroneously determined by intervals between detectors in the light color pattern filter.
Figure 5:
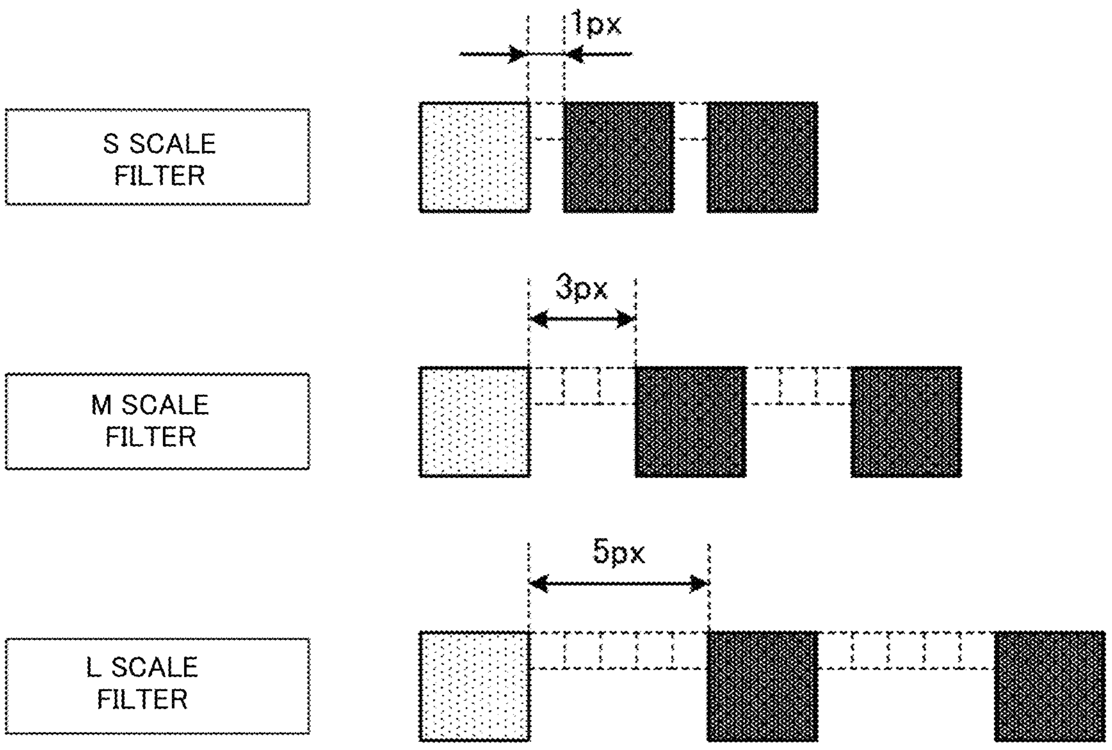
FIG. 5 illustrates a configuration example of each of the light color pattern filters by scale.
Figure 6:
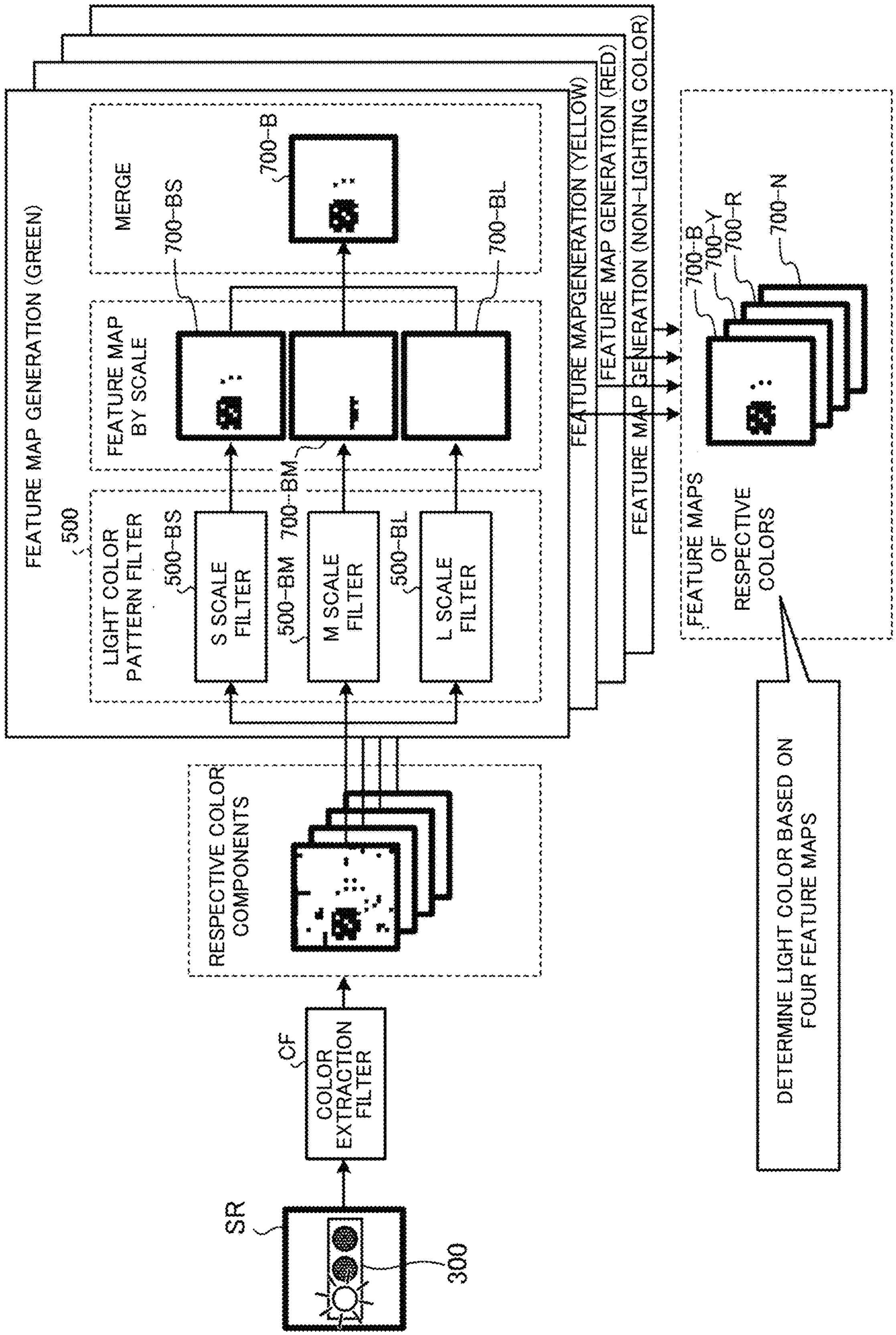
FIG. 6 is a schematic explanatory diagram (No. 3) of the image processing method according to the embodiment.

First, an outline of the image processing method according to the embodiment will be described with reference to FIG. 1 to FIG. 6. FIG. 1 is a schematic explanatory diagram (No. 1) of the image processing method according to the embodiment. FIG. 2 illustrates a configuration example of a light color pattern filter 500 according to the embodiment. FIG. 3 is a schematic explanatory diagram (No. 2) of the image processing method according to the embodiment. FIG. 4 is an explanatory diagram in a case where a light color may be erroneously determined by intervals i among a detector 501, a detector 502 and a detector 503 in the light color pattern filter 500. FIG. 5 illustrates a configuration example of each of the light color pattern filters by scale. FIG. 6 is a schematic explanatory diagram (No. 3) of the image processing method according to the embodiment.

The image processing apparatus 10 detects the lighting state of the traffic light 300, and determines whether or not a driver of the vehicle is ignoring the traffic light based on the detection result, for example. Such information processing is executed by a controller 12 (refer to FIG. 7) included in the image processing apparatus 10.

As illustrated in FIG. 1, the controller 12 inputs the camera image and identifies a rectangular region in which the traffic light 300 exists from the image. (a step S1). In the step S1, an existing image processing technology is applied. In the step S1, the controller 12 identifies the rectangular region in which the traffic light 300 exists from the image using a DNN (Deep Neural Network) model, etc., learned by using a machine learning algorithm. In the following, such a rectangular region is referred to as a "signal region SR".

Subsequently, the controller 12 inputs the signal region SR to determine the lighting state of the traffic light 300 (a step S2). In the step S2, the controller 12 analyzes an image of the signal region SR to determine whether the traffic light 300 is in the green lighting state, the yellow lighting state, the red lighting state or the non-lighting state. Specifically, the controller 12 detects green pixels, yellow pixels and red pixels from the plurality of the pixels in the signal region SR to determine the light color of the traffic light 300 based on a total value of the pixels.

Next, the controller 12 performs motion estimation of estimating how the traffic light 300 moves relative to a traveling vehicle by a difference between frames of the camera image (a step S3). Then, the controller 12 determines whether or not the driver of the vehicle is ignoring the traffic light based on a result of a lighting state determination in the step S2 and a result of the motion estimation in the step S3 (a step S4), and outputs the determination result.

The image processing method according to this embodiment is applied in the step S2 surrounded by a dashed rectangle. In the image processing method according to this embodiment, in the step S2, the controller 12 detects the pixels having respective color components corresponding to the respective light colors of the traffic light 300 from the plurality of the pixels in the signal region SR using a color extraction filter that is a conventional technology. The controller 12 applies the light color pattern filter 500 (refer to FIG. 2) according to the embodiment to the detected pixels having the respective color components, and generate a feature map 700 (refer to FIG. 6) showing a feature amount of the pixels having the respective color components for arrangement patterns of the respective color components in the respective lighting states of the traffic light 300. The controller 12 detects the pixels having the respective color components indicated by the feature map 700 to determine the light color of the traffic light 300 based on the total value of the pixels The light color pattern filter 500 according to the embodiment is set by the controller 12 so as to present the arrangement patterns of the respective color components in the respective lighting states of the traffic light 300 corresponding to an arrangement of the respective lighting devices included in the traffic light 300.

Specifically, as illustrated in FIG. 2, the light color patter filter 500 includes the first detector 501, the second detector 502, and the third detector 503. The first detector 501 detects the pixels having a color component corresponding to a position of a green lighting device 301 of the traffic light 300 in the signal region SR. The second detector 502 detects the pixels having a color component corresponding to a position of a yellow lighting device 302 of the traffic light 300 in the signal region SR. The third detector 503 detects the pixels having a color component corresponding to a position of a red lighting device 303 of the traffic light 300 in the signal region SR.

As illustrated in FIG. 2, each of the detectors 501, 502, and 503 is set to detect the pixels having the respective color components in the region with 3×3 pixels (px), for example.

Furthermore, the light color pattern filter 500 is set so that the first detector 501, the second detector 502, and the third detector 503 are arranged along a longitudinal direction of the traffic light 300 with the predetermined intervals i. Thus, it is possible to set the light color pattern filter 500 to cover the arrangement patterns of the respective color components in the respective lighting states of the traffic light 300 having at least three lights.

In the light color pattern filter 500, at least two of the first detector 501, the second detector 502, and the third detector 503 detect black pixels having a non-lighting color component (e.g., black) and the remaining one detects green, yellow or red pixels having the light color (green, yellow or red) component or the black pixels having the non-lighting color component. FIG. 2 illustrates an example in which the light color pattern filter 500 is a green pattern filter that shows the arrangement patterns of the respective color components in the green lighting state in which the green lighting device 301 of the traffic light 300 is turned on.

Hereinafter, the green pattern filter is referred to as a "green pattern filter 500-B", a yellow pattern filter is referred to as a "yellow pattern filter 500-Y", a red pattern filter is referred to as a "red pattern filter 500-R", and a non-lighting color pattern filter is referred to as an "non-lighting color pattern filter 500-N", accordingly.

As illustrated in FIG. 3, in the image processing method according to the embodiment, the controller 12 applies the light color pattern filter 500 to the signal region SR identified in the step S1. At this time, the controller 12 applies the green pattern filter 500-B, the yellow pattern filter 500-Y, the red pattern filter 500-R, and the non-lighting color pattern filter 500-N to the signal region SR, respectively. As a result, when the arrangement patterns of the respective color components of the traffic light 300 is, for example, determined to correspond to a green pattern, the controller 12 determines that a green light of the traffic light 300 is turned on.

By the way, in the step S1, the controller 12 identifies the signal region SR by sampling from the camera image so that the signal region SR always has the same shape and size of 25×25 pixels, for example, as illustrated in FIG. 3. However, since errors occur in a distance between an in-vehicle camera and the traffic light 300 due to a road surface slope, an installation angle of an in-vehicle camera, and the like, it is assumed that a size of the traffic light 300 may be not always the same in the signal region SR.

Thus, as shown in a left drawing of FIG. 4, for example, in a case where the traffic light 300 is detected larger than usual, if the controller 12 uses the green pattern filter 500-B in which the intervals i described above are constant, the controller 12 may determine that the arrangement patterns of the respective color components of the traffic light 300 do not correspond to the green pattern regardless of the green lighting state. In an example of the left drawing of FIG. 4, at least the third detector 503 detects the pixels having the color component between the yellow lighting device 302 and the red lighting device 303. Thus, the third detector 503 may not detect a non-lighting color of the red lighting device 303 in the green lighting state.

As shown in a right drawing of FIG. 4, similarly for the case in which the traffic light 300 is detected smaller than usual, if the controller 12 uses the green pattern filter 500-B in which the intervals i described above are constant, the controller 12 may determine that the arrangement patterns of the respective color components of the traffic light 300 do not correspond to the green pattern regardless of the green lighting state. In an example of the right drawing of FIG. 4, at least the third detector 503 detects the pixels having the color component of a background of the traffic light 300, and thus, may not detect the non-lighting color of the red lighting device 303 in the green lighting state. The second detector 502 detects the pixels having the color component between the yellow lighting device 302 and the red lighting device 303, and thus, may not detect the non-lighting color of the yellow lighting device 302 in the green lighting state. In FIG. 4, the green pattern filter 500-B has been illustrated as an example, the same applies to the yellow pattern filter 500-Y, the red pattern filter 500-R, and the non-lighting color pattern filter 500-N.

Therefore, in the image processing method according to the embodiment, for each of the pattern filters 500-B, 500-Y, 500-R, and 500-N, the light color pattern filters 500 having a plurality of scales with different intervals i are provided.

Specifically, as illustrated in FIG. 5, the controller 12 sets, for example, three types of scale filters with different intervals i for each of the pattern filters 500-B, 500-Y, 500-R, and 500-N. In an S (small) scale filter, the intervals i are set to one pixel, for example. In an M (medium) scale filter, the intervals i are set to three pixels, for example. In an L (large) scale filter, the intervals i are set to five pixels, for example. The controller 12 applies the respective scale filters with different intervals i to the signal region SR for the respective color components corresponding to the respective light colors of the traffic light 300.

As a result, even when the size of the traffic light 300 is not always the same in the signal region SR identified with 25×25 pixels, it is possible to determine whether or not an arrangement of the detected pixels having the respective color components according to changes in the size of the traffic light 300 and the signal region SR corresponds to the arrangement patterns of the respective color components of the traffic light 300.

In the following, for the green pattern filter 500-B, a symbol "500-BS" is placed to the S scale filter, a symbol "500-BM" is placed to the M scale filter, and a symbol "500-BL" is placed to the L scale filter. "-BS" is placed to the feature map 700 to be generated by the S scale filter 500-BS. "-BM" is placed to the feature map 700 to be generated by the M scale filter 500-BM. "-BL" is placed to the feature map 700 to be generated by the L scale filter 500-BL.

For the yellow pattern filter 500-Y, a symbol "500-YS" is placed to the S scale filter, a symbol "500-YM" is placed to the M scale filter, and a symbol "500-YL" is placed to the L scale filter. "-YS" is placed to the feature map 700 to be generated by the S scale filter 500-YS. "-YM" is placed to the feature map 700 to be generated by the M scale filter 500-YM. "-YL" is placed to the feature map 700 to be generated by the L scale filter 500-YL.

For the red pattern filter 500-R, a symbol "500-RS" is placed to the S scale filter, a symbol "500-RM" is placed to the M scale filter, and a symbol "500-RL" is placed to the L scale filter. "-RS" is placed to the feature map 700 to be generated by the S scale filter 500-RS. "-RM" is placed to the feature map 700 to be generated by the M scale filter 500-RM. "-RL" is placed to the feature map 700 to be generated by the L scale filter 500-RL.

For the non-lighting color pattern filter 500-N, a symbol "500-NS" is placed to the S scale filter, a symbol "500-NM" is placed to the M scale filter, and a symbol "500-NL" is placed to the L scale filter. "-NS" is placed to the feature map 700 to be generated by the S scale filter 500-NS. "-NM" is placed to the feature map 700 to be generated by the M scale filter 500-NM. "-NL" is placed to the feature map 700 to be generated by the L scale filter 500-NL.

In summary, as illustrated in FIG. 6, in the image processing method according to the embodiment, the controller 12 applies the color extraction filter CF that is the conventional technology to the signal region SR so as to detect the pixels having the respective color components corresponding to the respective light colors of the traffic light 300. The respective color components described here refer to four types of color components of green, yellow, red and non-lighting color.

Then, in the image processing method according to the embodiment, the controller 12 applies the light color pattern filter 500 to the detected pixels having the respective color components so as to generate the feature map 700 of each color. As illustrated in FIG. 6, for green, the controller 12 applies the green S scale filter 500-BS, the green M scale filter 500-BM, the green L scale filter 500-BL to the pixels having a green component (strictly, also the non-lighting color component) detected by the color extraction filter CF.

As a result, the controller 12 generates three feature maps by scale 700-BS, 700-BM, 700-BL corresponding to the green S scale filter 500-BS, the green M scale filter 500-BM, the green L scale filter 500-BL, respectively. As described above, the feature map 700 indicates the feature amount of the pixels having the respective color components corresponding to the arrangement patterns of the respective color components in the respective lighting states of the traffic light 300. The feature amount here means, for example, the total value of the pixels having the respective color components corresponding to the arrangement patterns of the respective color components in the respective lighting states of the traffic light 300.

Then, the controller 12 generates a green feature map 700-B by merging (superimposing) the three feature maps by scale 700-BS, 700-BM, 700-BL.

Although illustration is omitted, the same applies to other colors than green. In the case of yellow, the controller 12 applies the yellow S scale filter 500-YS, the yellow M scale filter 500-YM, the yellow L scale filter 500-YL to the detected pixels having a yellow component (strictly, also the non-lighting color component) of the respective color components. As a result, the controller 12 generates three feature maps by scale 700-YS, 700-YM, 700-YL, and generates a yellow feature map 700-Y by merging the three scale feature maps 700-YS, 700-YM, 700-YL.

In the case of red, the controller 12 applies the red S scale filter 500-RS, the red M scale filter 500-RM, the red L scale filter 500-RL to the detected pixels having a red component (strictly, also the non-lighting color component) of the respective color components. As a result, the controller 12 generates three feature maps by scale 700-RS, 700-RM, 700-RL, and generates a red feature map 700-R by merging the three scale feature maps 700-RS, 700-RM, 700-RL.

In the case of the non-lighting color, the controller 12 applies the non-lighting color S scale filter 500-NS, the non-lighting color M scale filter 500-NM, the non-lighting color L scale filter 500-NL to the detected pixels having the non-lighting color component of the respective color components. As a result, the controller 12 generates three feature maps by scale 700-NS, 700-NM, 700-NL, and generates a non-lighting color feature map 700-N by merging the three scale feature maps 700-NS, 700-NM, 700-NL.

That is, the controller 12 generates 12 feature maps 700 including S, M, L scales, and merges scale-specific portions of the 12 feature maps 700 into four feature maps corresponding to the respective color components.

By generating the 12 feature maps 700 including S, M, L scales, even when the size of the traffic light 300 is not always the same in the signal region SR, the controller 12 determines whether or not the arrangement of the detected pixels having the respective color components corresponds to the arrangement patterns of the respective color components of the traffic light 300.

The controller 12 merges the scale-specific portions of the 12 feature maps 700. Thus, even when the size of the traffic light 300 is not always the same in the signal region SR, the controller 12 easily determines whether or not the arrangement of the detected pixels having the respective color components corresponds to the arrangement patterns of the respective color components of the traffic light 300. Furthermore, this merging allows the controller 12 to generate the feature map 700 that is detectable for the arrangement patterns of the pixels having the respective color components of the traffic light 300 on a scale intermediate between S and M scales. Similarly, the controller 12 generates the feature map 700 that is detectable for the arrangement patterns of the pixels having the respective color components of the traffic light 300 on a scale intermediate between M and L scales.

The controller 12 determines the light color based on the four feature maps 700 after merging the scale-specific portions. Specifically, when any of the detected amounts of the pixels having the green, yellow and red components in the feature maps 700-B, 700-Y, and 700-R is a predetermined value or more, the controller 12 determines that a color of the pixels having the color component with the highest detected amount is the light color of the traffic light 300. The detected amount means a number of the pixels mapped in the respective feature maps 700 as corresponding to the respective color components. As a result, the controller 12 determines that the color of the pixels having the color component with the highest detected amount is the light color of the traffic light 300 in the arrangement patterns of the detected pixels having the respective color components as corresponding to the arrangement patterns of the respective color components in the respective lighting states of the traffic light 300. That is, the controller 12 accurately detects the light color of the traffic light 300 by performing determination based on the arrangement patterns of the respective color components according to preset positions of a plurality of the lighting devices, rather than solely relying on the luminance level of a single lighting device.

When the detected amounts of the pixels having the green, yellow, and red components are all less than the predetermined value, and if a detected amount of pixels having the non-lighting color component in the feature map 700-N is the predetermined value or more, the controller 12 determines that the traffic light 300 is in the non-lighting state. As a result, the controller 12 determines the light color of the traffic light 300 by determining a state in which the traffic light 300 is in the non-lighting state, which is not detected solely by the luminance level of the single lighting device based on the arrangement patterns of the respective color components according to the preset positions of the plurality of the lighting devices.

As described above, in the image processing method according to the embodiment, the controller 12 sets the arrangement patterns of the respective color components in the respective lighting states of the traffic light 300 corresponding to the arrangement of the respective lighting devices 301, 302, and 303 of the traffic light 300 as a plural types of the light color pattern filters 500 with different intervals i between the detectors that detect the pixels having the respective color components. The controller 12 performs image recognition of the camera image to identify the signal region SR in which the traffic light 300 exists in the camera image. The controller 12 generates a plurality of the feature maps 700 indicating the feature amount for the arrangement pattern of each of the respective color components via the plural types of the light color pattern filters 500 from the signal region SR, and determines the light color of the traffic light 300 based on the plurality of the feature maps 700.

As a result, the controller 12 detects the pixels having the respective color components corresponding to the arrangement patterns of the respective color components in the respective lighting states of the traffic light 300. Since the controller 12 determines the light color by the respective color components corresponding to the arrangement of the respective lighting devices 301, 302, and 303, it is possible to suppress an occurrence of erroneous determination compared to when determining the light color solely by the luminance level of the single lighting device. That is, in the image processing method according the embodiment, it is possible to improve a detection accuracy of the light color of the traffic light 300.

In the following, a configuration example of the image processing apparatus 10 to which the image processing method according to the embodiment is applied will be more specifically described.

Figure 7:
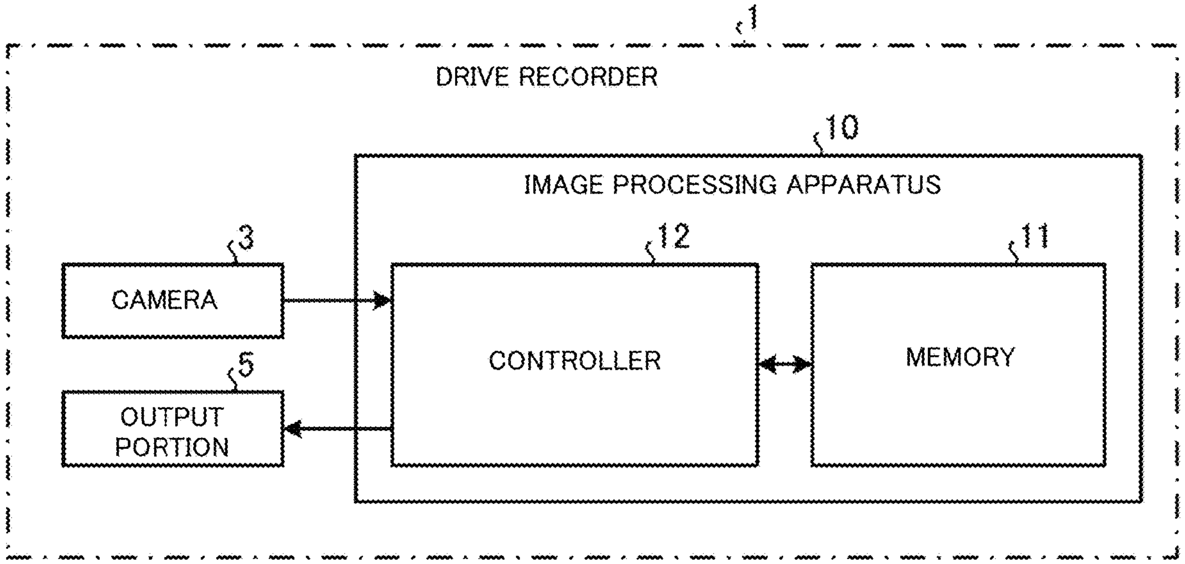
FIG. 7 illustrates a configuration example of the image processing apparatus according to the embodiment.

FIG. 7 illustrates the configuration example of the image processing apparatus 10 according to the embodiment. As illustrated in FIG. 7, the image processing apparatus 10 includes a memory 11 and the controller 12. A camera 3 and an output portion 5 are connected to the image processing apparatus 10.

The camera 3 is mounted in the vehicle and provided to capture an image in front of the vehicle. The camera 3 may be a 360-degree camera capable of capturing images not only in front of the vehicle but also all around the vehicle.

The output portion 5 is an output device that presents output information from the image processing apparatus 10. The output portion 5 is implemented by a display, a speaker, and the like.

The image processing apparatus 10 is a computer to be mounted in the vehicle. The image processing apparatus 10 performs at least information processing of the steps S1 to S4 described with reference to FIG. 1.

The memory 11 is implemented by a storage device, such as a RAM (Random Access Memory) or a flash memory. The memory 11 stores a computer program according to the embodiment executed by the controller 12. Furthermore, the memory 11 stores various information that is used in the information processing executed by the controller 12.

The memory 11 stores, for example, an AI (Artificial Intelligence) model for the image recognition. The memory 11 stores setting information of the color extraction filter CF and the light color pattern filter 500.

The controller 12 corresponds to a processor. The controller 12 is implemented by a CPU (Central Processing Unit), an MPU (Micro Processing Unit), a GPU (Graphics Processing Unit), or the like. The controller 12 reads and executes a computer program according to the embodiment stored in the memory 11 using the RAM as a work area. The controller 12 is also implemented by an integrated circuit, such as an ASIC (Application Specific Integrated Circuit) or a FPGA (Field Programmable Gate Array).

Figure 9:
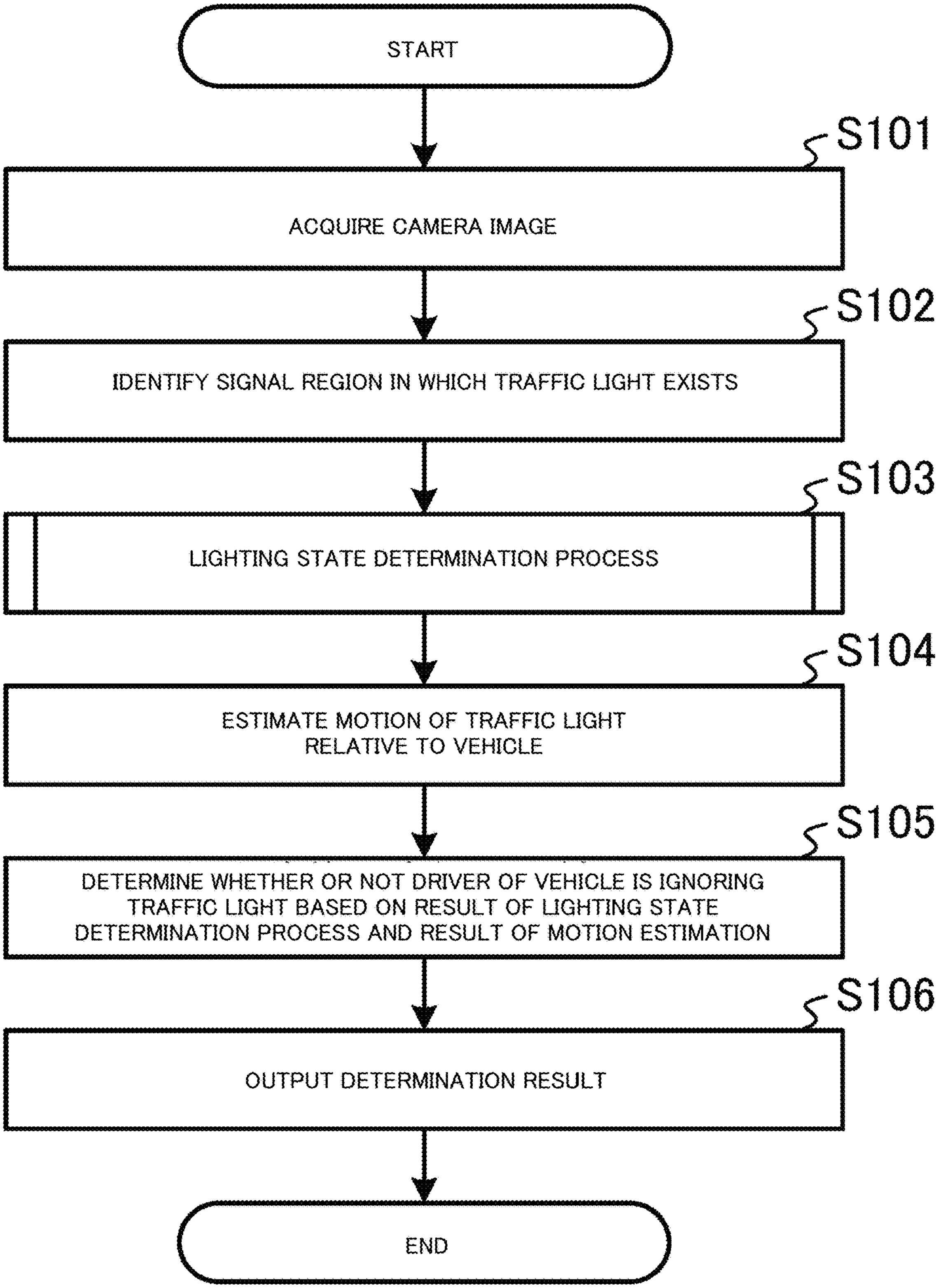
FIG. 9 is a flowchart (No. 1) illustrating a processing procedure executed by the image processing apparatus according to the embodiment.
Figure 10:
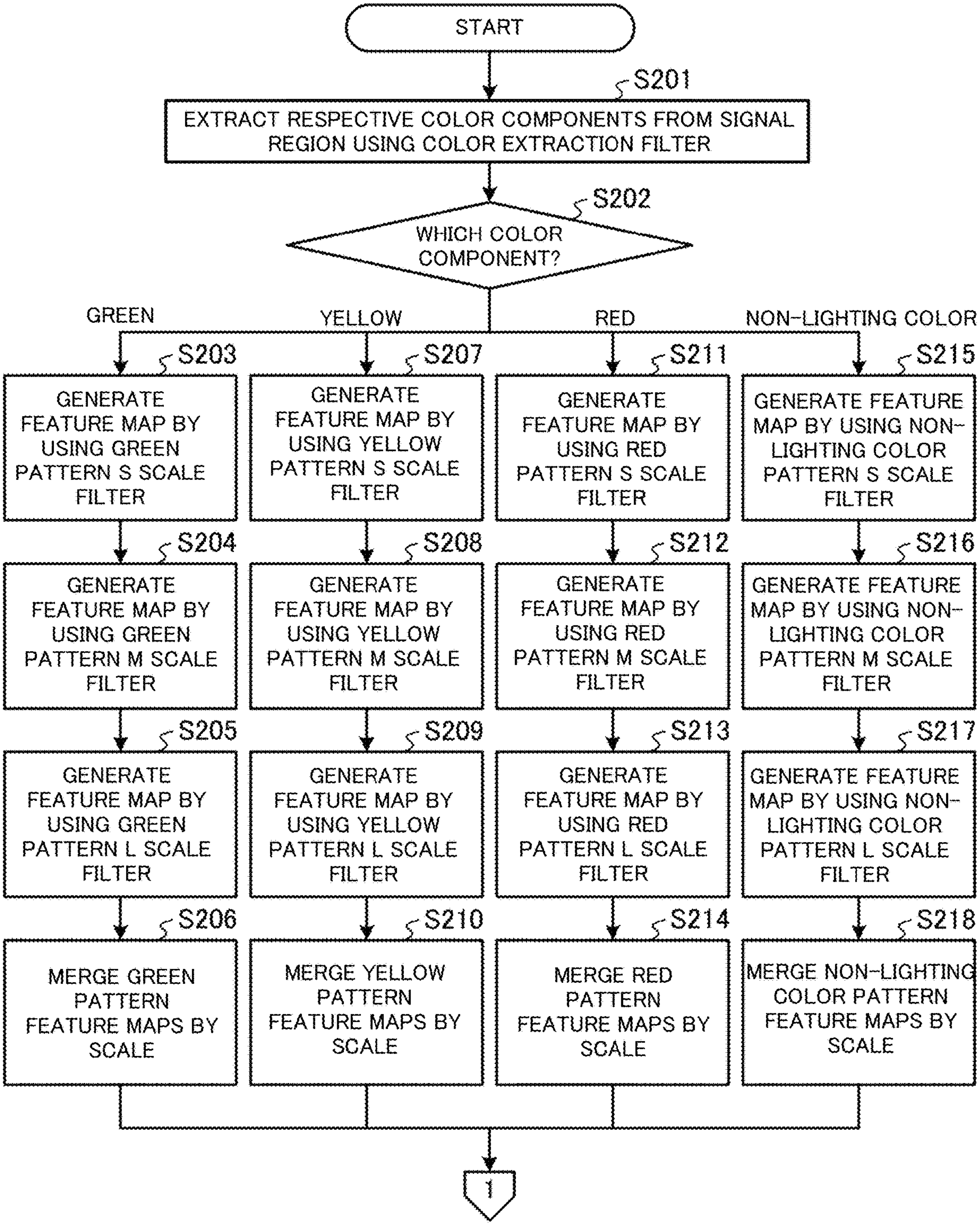
FIG. 10 is a flowchart (No. 2) illustrating the processing procedure executed by the image processing apparatus according to the embodiment.
Figure 11:
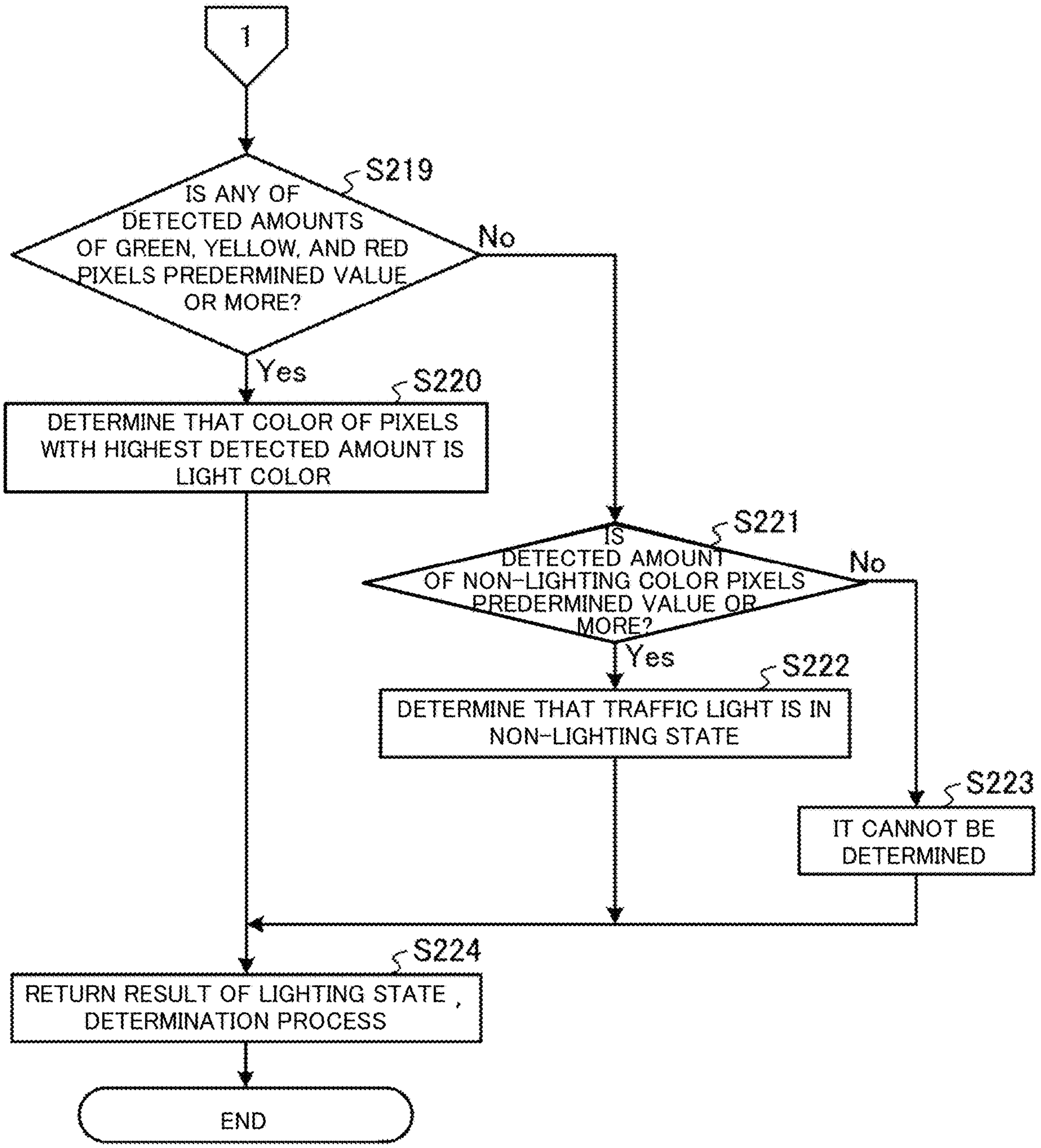
FIG. 11 is a flowchart (No. 3) illustrating the processing procedure executed by the image processing apparatus according to the embodiment.

The controller 12 performs the information processing according to the processing procedure illustrated in each flowchart of FIG. 9 to FIG. 11. An explanation with reference to FIG. 9 to FIG. 11 will be described later.

As illustrated in FIG. 7, the camera 3, the output portion 5 and the image processing apparatus 10 are implemented as a drive recorder 1. In this case, the camera 3 is implemented by a camera unit to be mounted in the drive recorder 1. The output portion 5 is implemented by a display and a speaker to be mounted in the drive recorder 1. The image processing apparatus 10 is implemented by a microcomputer to be mounted in the drive recorder 1.

Figure 8:
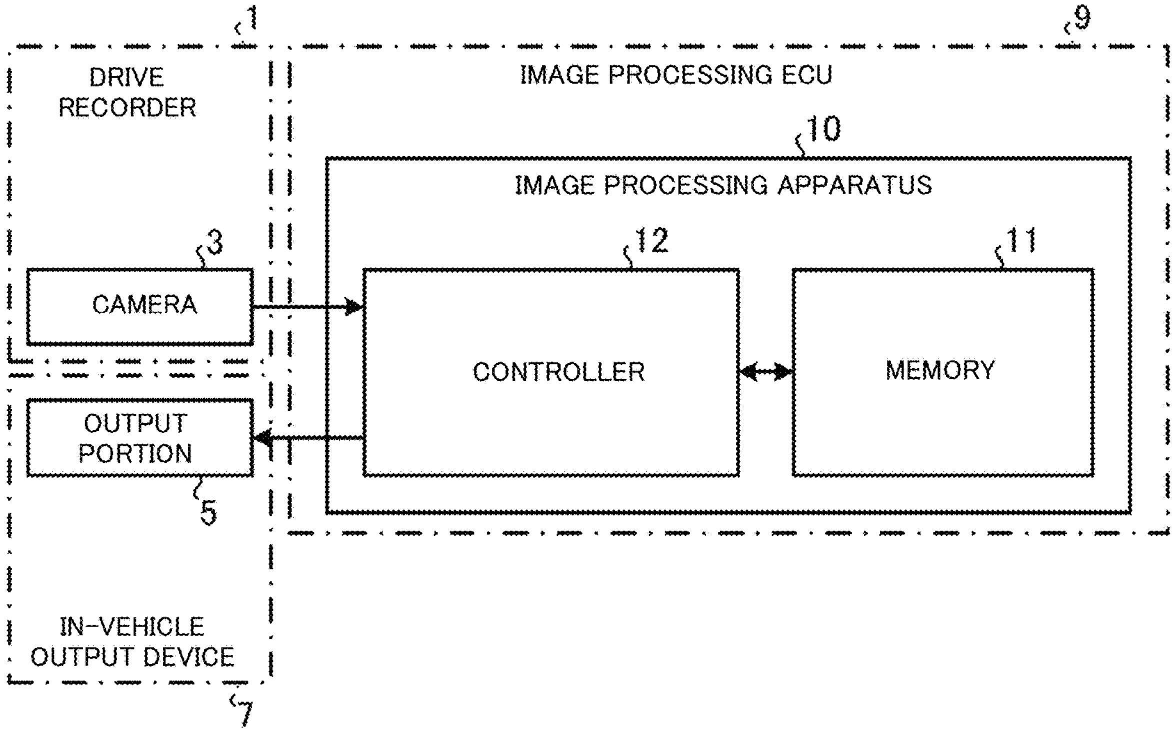
FIG. 8 illustrates a configuration example of the image processing apparatus according to a modification example.

The configuration example illustrated in FIG. 7 is one example, and besides this, a modification example will be given. FIG. 8 illustrates a configuration example of an image processing apparatus 10 according to a modification example. As illustrated in FIG. 8, the image processing apparatus 10 is implemented as an image processing ECU (Electronic Control Unit) 9. In this case, a camera 3 is, for example, implemented by a camera unit to be mounted in a drive recorder 1. The camera 3 may be implemented by an in-vehicle camera unit other than the drive recorder 1. An output portion 5 is implemented by an in-vehicle display or an in-vehicle speaker as an in-vehicle output device 7 to be mounted in a vehicle.

In an example of FIG. 8, the camera 3 and the output portion 5 are connected to the image processing apparatus 10 via an in-vehicle network, such as a CAN (Controller Area Network). The camera 3 and the output portion 5 may be connected to the image processing apparatus 10 via a Bluetooth (registered trademark), a Wi-Fi (registered trademark), a UWB (Ultra Wide Band), or the like, by using a wireless network.

Next, a processing procedure of the information processing executed by the controller 12 of the image processing apparatus 10 will be described with reference to FIG. 9 to FIG. 11. FIG. 9 is a flowchart (No. 1) illustrating the processing procedure executed by the image processing apparatus 10 according to the embodiment. FIG. 10 is a flowchart (No. 2) illustrating the processing procedure executed by the image processing apparatus 10 according to the embodiment. FIG. 11 is a flowchart (No. 3) illustrating the processing procedure executed by the image processing apparatus 10 according to the embodiment.

In order to determine whether or not the driver of the vehicle is ignoring the traffic light as illustrated in FIG. 1, as illustrated in FIG. 9, the controller 12 acquires the camera image from the camera 3 (a step S101). Subsequently, the controller 12 identifies the signal region SR in which the traffic light 300 exists from the acquired camera image (a step S102).

Subsequently, the controller 12 performs a "lighting state determination process" to determine the lighting state of the traffic light 300 based on the identified signal region SR (a step S103).

In this "lighting state determination process", as illustrated in FIG. 10, the controller 12 applies the color extraction filter CF to the signal region SR, and detects the pixels having the respective color components from the plurality of the pixels in the signal region SR using the color extraction filter CF (a step S201).

The controller 12 distributes the processes according to which color component (a step S202). When the color component is green (Green in the step S202), the controller 12 generates the feature map 700-BS by using the green pattern S scale filter 500-BS (a step S203).

The controller 12 generates the feature map 700-BM by using the green pattern M scale filter 500-BM (a step S204). The controller 12 generates the feature map 700-BL by using the green pattern L scale filter 500-BL (a step S205). The order of the steps S203 to 205 is arbitrary. The steps S203 to S205 may be performed in parallel.

Figure 12:
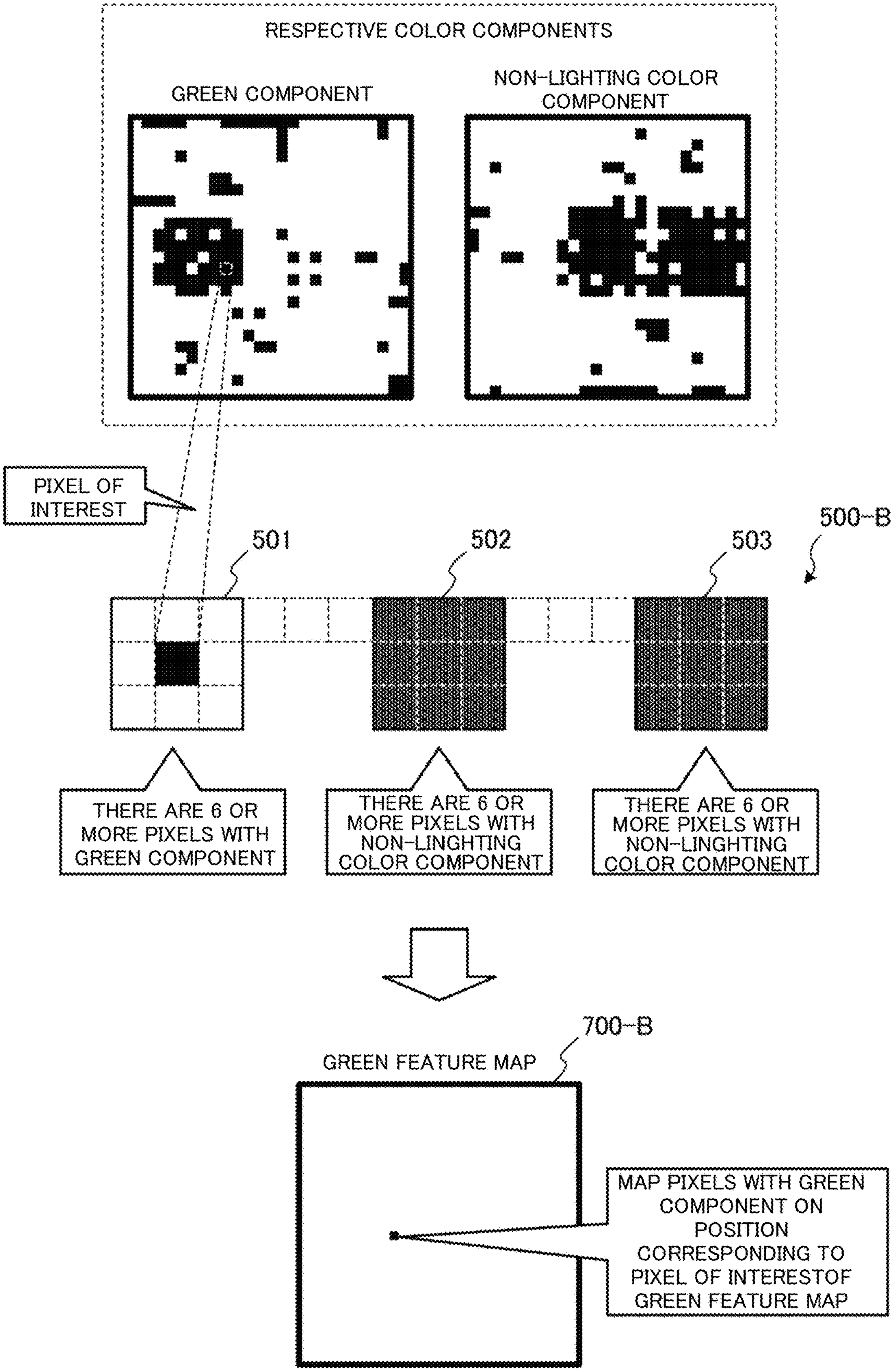
FIG. 12 is an explanatory diagram of a feature map generation process.

Here, a feature map generation process will be specifically described with reference to FIG. 12. FIG. 12 is an explanatory diagram of the feature map generation process. In FIG. 12, a case in which the controller 12 generates the green feature map 700-B using the green pattern filter 500-B will be described as an example. For other colors, the respective color components and light color pattern filters 500 according to the respective colors may be applied. The example shown in FIG. 12 does not matter what the scale is.

When the controller 12 generates the green feature map 700-B, as illustrated in FIG. 12, the controller 12 inputs the green component and the non-lighting color component among the respective color components included in the pixels detected by the color extraction filter CF. The controller 12 performs scanning with the green pattern filter 500-B for the pixels detected as corresponding to the green component in 25×25 pixels corresponding to the signal region SR, shifting a pixel of interest one by one. The controller 12 also performs scanning with the green pattern filter 500-B synchronously for the non-lighting color component. The controller 12 may apply the green pattern filter 500-B after superimposing the non-lighting color component on the green component.

Then, when there are 6 or more pixels having the green component in the region corresponding to the first detector 501 relative to the pixel of interest, the controller 12 determines whether or not there are 6 or more pixels having the non-lighting color component in each of the regions corresponding to the second detector 502 and the third detector 503.

When there are 6 or more pixels having the non-lighting color component in each of the regions corresponding to the second detector 502 and the third detector 503, the controller 12 maps the pixels having the green component on a position corresponding to the pixel of interest of the green feature map 700-B. By repeating this process while shifting the pixel of interest, the controller 12 generates the green feature map 700-B that detects only the pixels having the green component corresponding to the arrangement patterns of the respective color components in the green lighting state of the traffic light 300.

Referring back to FIG. 10, the controller 12 merges the green pattern three feature maps by scale 700-BS, 700-BM, and 700-BL (a step S206). Thus, the controller 12 generates the green feature map 700-B.

When the color component is yellow (Yellow in the step S202), the controller 12 generates the feature map 700-YS by using the yellow pattern S scale filter 500-YS (a step S207).

The controller 12 generates the feature map 700-YM by using the yellow pattern M scale filter 500-YM (a step S208). The controller 12 generates the feature map 700-YL by using the yellow pattern L scale filter 500-YL (a step S209). The order of the steps S207 to 209 is arbitrary. The steps S207 to S209 may be performed in parallel.

The controller 12 merges the yellow pattern three feature maps by scale 700-YS, 700-YM, and 700-YL (a step S210). Thus, the controller 12 generates the yellow feature map 700-Y.

When the color component is red (Red in the step S202), the controller 12 generates the feature map 700-RS by using the red pattern S scale filter 500-RS (a step S211).

The controller 12 generates the feature map 700-RM by using the red pattern M scale filter 500-RM (a step S212). The controller 12 generates the feature map 700-RL by using the red pattern L scale filter 500-RL (a step S213). The order of the steps S211 to 213 is arbitrary. The steps S211 to S213 may be performed in parallel.

The controller 12 merges the red pattern three feature maps by scale 700-RS, 700-RM, and 700-RL (a step S214). Thus, the controller 12 generates the red feature map 700-R.

When the color component is the non-lighting color (Non-lighting color in the step S202), the controller 12 generates the feature map 700-NS by using the non-lighting color pattern S scale filter 500-NS (a step S215).

The controller 12 generates the feature map 700-NM by using the non-lighting color pattern M scale filter 500-NM (a step S216). The controller 12 generates the feature map 700-NL by using the non-lighting color pattern L scale filter 500-NL (a step S217). The order of the steps S215 to 217 is arbitrary. The steps S215 to S217 may be performed in parallel.

The controller 12 merges the non-lighting color pattern three feature maps by scale 700-NS, 700-NM, and 700-NL (a step S218). Thus, the controller 12 generates the non-lighting color feature map 700-N.

Subsequently, as illustrated in FIG. 11, the controller 12 determines whether or not any of the detected amounts of the pixels having the green, yellow and red components is the predetermined value or more based on the four feature maps 700-B, 700-Y, 700-R, and 700-N, (a step S219).

When any of the detected amounts of the pixels having the green, yellow, and red components is the predetermined value or more (Yes in the step S219), the controller 12 determines that the color of the pixels having the color component with the highest detected amount is the light color (a step S220). When the detection amounts of the pixels having the green, yellow, and red components are all less than the predetermined value (No in the step S219), the controller 12 determines whether or not the detected amount of the pixels having the non-lighting color component is the predetermined value or more (a step S221).

When the detected amount of the pixels having the non-lighting color component is the predetermined value or more (Yes in the step S221), the controller 12 determines that the traffic light 300 is in the non-lighting state (a step S222). When the detected amount of the pixels having the non-lighting color component is less than the predetermined value (No in the step S221), the controller 12 determines that it cannot be determined (a step S223).

Subsequently, the controller 12 returns a result of the lighting state determination process (a step S224). Then, the controller 12 ends the lighting state determination process.

Referring back to FIG. 9, when the controller 12 ends the step S103, the controller 12 estimates a motion of the traffic light 300 relative to the vehicle (a step S104). The controller 12, as described above, estimates how the traffic light 300 moves relative to the traveling vehicle by the difference between the frames of the camera image, for example.

Subsequently, the controller 12 determines whether or not the driver of the vehicle is ignoring the traffic light based on the result of the lighting state determination process in the step S103 and the result of the motion estimation in the step S104 (a step S105).

Although the traffic light 300 that presents priority of traffic in the traveling direction of the vehicle is in the red lighting state, when the vehicle continues to travel for a predetermined time or longer and at a predetermined speed or faster, the controller 12 determines that the driver of the vehicle has ignored the traffic light.

Then, the controller 12 outputs the determination result in the step S105 to the output portion 5 (a step S106) and the ends the process.

Although illustration is omitted, the controller 12 may output the determination result to the output portion 5 based on stability of the determination result between the frames of the camera image. In one example, when the stability is considered to be high, such as the same consecutive determination results between the frames, the controller 12 may output the determination result to the output portion 5. As a result, it is possible to output the stable determination result that is hardly affected by a disturbance, and the like.

As described above, the image processing apparatus 10 according to the embodiment has the controller 12 that determines the light color of the traffic light 300 from the camera image. The controller 12 sets the arrangement patterns of the respective color components in the respective lighting states of the traffic light 300 corresponding to the arrangement of the respective lighting devices 301, 302, and 303 of the traffic light 300 as the plural types of the light color pattern filters 500 (corresponding to one example of the "pattern filters") with different intervals i between the detectors that detect the pixels having the respective color components. The controller 12 performs image recognition of the camera image to identify the signal region SR in which the traffic light 300 exists in the camera image. The controller 12 generates the plurality of the feature maps 700 indicating the feature amount for the arrangement pattern of each of the respective color components via the plural types of the light color pattern filters 500 from the signal region SR, and determines the light color of the traffic light 300 based on the plurality of the feature maps 700. As a result, the controller 12 detects the pixels having the respective color components corresponding to the arrangement patterns of the respective color components in the respective lighting states of the traffic light 300. Therefore, since the controller 12 determines the light color by the respective color components corresponding to the arrangement of the respective lighting devices 301, 302, and 303, it is possible to suppress the occurrence of erroneous determination, compared to when determining the light color solely by the luminance level of the single lighting device, for example. That is, in the image processing method according the embodiment, it is possible to improve the detection accuracy of the light color of the traffic light 300.

In the embodiment described above, although the light color pattern filters 500 have three types of scales, i.e., S, M and L scales, this is merely one example. A number of types of the scales is not limited to three.

In the embodiment described above, although the light color pattern filters 500 are set for each of the four types of the color components, i.e., the green, yellow, red and non-lighting color components corresponding to the respective lighting states of the traffic signal 300, this is merely one example. A number of types of the color components is not limited to four. For example, the respective color components corresponding to the respective lighting states of the traffic light 300 may include an arrow color of the arrow traffic light 300. In this case, the light color pattern filters 500 include the arrangement patterns of a color component corresponding to a position of an arrow lighting device.

In the embodiment described above, although an example in which the signal region SR is a rectangular region of 25×25 pixels has been described, this is merely one example. A size and shape of the signal region SR is not limited thereto. A number of the pixels constituting the signal region SR may be appropriately changed according to processing capability of the image processing apparatus 10. The signal region SR does not need to be a square as a rectangular region.

In the embodiment described above, although an example in which each of the detectors 501, 502, and 503 is set to detect the pixels having the respective color components in the region of 3×3 pixels has been described, a size of each of the detectors 501, 502, and 503 is not limited thereto. The size of each of the detectors 501, 502, and 503 may be appropriately changed, for example, according to a change in the number of the pixels constituting the signal region SR. The requirement of 6 or more pixels in the feature map generation process described above may be appropriately changed according to a change in the size of each of the detectors 501, 502, and 503.

The intervals i described above may be appropriately changed according to the types of the scales, the number of the pixels constituting the signal region SR, the size of each of the detectors 501, 502, and 503, and the like. In the embodiment described above, although the signal region SR is a rectangular region, the signal region SR is not limited to a rectangular region.

In the embodiment described above, although the lighting state determination and motion estimation of the traffic light 300 and determination of whether or not the driver of the vehicle is ignoring the traffic light are performed based on the image recognition, sensor data of various sensors mounted in the vehicle may be naturally combined with the image recognition as appropriate. For example, a behavior of the vehicle may be estimated by using a sensor value of a steering sensor or an acceleration sensor. An own vehicle speed may be acquired by using a sensor value of a speed sensor.

It is possible for a person skilled in the art to easily come up with more effects and modifications. Thus, a broader modification of this invention is not limited to specific description and typical embodiments described and expressed above. Therefore, various modifications are possible without departing from the general spirit and scope of the invention defined by claims attached and equivalents thereof.

While the invention has been shown and described in detail, the foregoing description is in all aspects illustrative and not restrictive. It is therefore understood that numerous other modifications and variations can be devised without departing from the scope of the invention.

What is claimed is:

1. An image processing apparatus comprising a controller that determines a light color of a traffic light from a camera image, the traffic light including a green light, a yellow light and a red light arranged in a line with the yellow light located between the green light and the red light, the controller configured to:

(i) perform image recognition of the camera image to identify a signal region in which the traffic light exists in the camera image;

(ii) provide a plurality of color pattern filters for each color of green, yellow and red, each of the color pattern filters having a first detector a second detector adjacent to the first detector, and a third detector adjacent to the second detector, one of the first, second and third detectors detecting pixels having one of the colors of green, yellow and red, and a remaining two of the first, second and third detectors detecting black pixels, the color pattern filters for each of the colors of green, yellow and red including at least (a) a first color pattern filter having a spatial interval with a first value between the first and second detectors and between the second and third detectors and (b) a second color pattern filter having a spatial interval with a second value different from the first value between the first and second detectors and between the second and third detectors;

(iii) generate a plurality of feature maps indicating a feature amount for an arrangement pattern of each of the green, yellow and red colors based on detections of the signal region by the detectors using at least the first and second color pattern filters for each of the colors of green, yellow and red; and (iv) determine the light color of the traffic light based on the plurality of feature maps.

2. The image processing apparatus according to claim 1, wherein the green light, the yellow light and the red light are arranged in a longitudinal direction of the signal region.

3. The image processing apparatus according to claim 2, wherein the plurality of feature maps are generated for a plurality of lighting states using the spatial intervals having the first and second values to detect the pixels having colors of green, yellow and red in each of the plurality of lighting states.

4. The image processing apparatus according to claim 3, wherein among the generated feature maps, the plurality of feature maps generated using the spatial intervals having the first and second values at which the colors of green, yellow and red are detected are superimposed to form one feature map, and the light color of the traffic light is determined based on the plurality of feature maps corresponding to the plurality of lighting states.

5. The image processing apparatus according to claim 4, wherein the feature amount is a detected amount of pixels having the color corresponding to arrangement patterns, and when any of the detected amounts of the pixels having a green component, a yellow component or a red component in the plurality of feature maps is a predetermined value or more, the color of the pixels having the color component with the highest detected amount is determined to be the light color of the traffic light.

6. The image processing apparatus according to claim 5, wherein when the detected amounts of the pixels having the green component, the yellow component and the red component are all less than the predetermined value, if a detected amount of pixels corresponding to a non-lighting color component in the plurality of feature maps is a predetermined amount or more, the traffic light is determined to be in a non-lighting state.

7. The image processing apparatus according to claim 2, wherein the signal region is a region of 25×25 pixels, the feature amount is a detected amount of pixels having the respective color components in a region of 3×3 pixels, the spatial intervals are one pixel, three pixels, and five pixels.

8. An image processing method executed by an image processing apparatus that determines a light color of a traffic light from a camera image, the traffic light including a green light, a yellow light and a red light arranged in a line with the yellow light located between the green light and the red light, the method comprising the steps of:

(a) performing image recognition of the camera image to identify a signal region in which the traffic light exists in the camera image;

(b) providing a plurality of color pattern filters for each color of green, yellow and red, each of the color pattern filters having a first detector, a second detector adjacent to the first detector, and a third detector adjacent to the second detector, one of the first, second and third detectors detecting pixels having one of the colors of green, yellow and red, and a remaining two of the first, second and third detectors detecting black pixels, the color pattern filters for each of the colors of green, yellow and red including at least (a) a first color pattern filter having a spatial interval with a first value between the first and second detectors and between the second and third detectors and (b) a second color pattern filter having a spatial interval with a second value different from the first value between the first and second detectors and between the second and third detectors;

(c) generating a plurality of feature maps indicating a feature amount for an arrangement pattern of each of the green, yellow and red colors based on detections of the signal region by the detectors using at least the first and second color pattern filters for each of the colors of green, yellow and red; and (d) determining the light color of the traffic light based on the plurality of feature maps.

9. The image processing method according to claim 8, wherein the green light, the yellow light and the red light are arranged in a longitudinal direction of the signal region.

10. The image processing method according to claim 9, wherein the plurality of feature maps are generated for a plurality of lighting states using the spatial intervals having the first and second values to detect the pixels having the colors of green, yellow and red in each of the plurality of lighting states.

11. The image processing method according to claim 10, further comprising:

among the generated feature maps, superimposing the plurality of feature maps generated using the spatial intervals having the first and second values at which the colors of green, yellow and red are detected to form one feature map, and determining the light color of the traffic light based on the plurality of feature maps corresponding to the plurality of lighting states.

12. A non-transitory computer-readable recording medium having stored therein a program that causes a computer of an image processing apparatus to execute a process that determines a light color of a traffic light from a camera image, the traffic light including a green light, a yellow light and a red light arranged in a line with the yellow light located between the green light and the red light, the process comprising:

(i) performing image recognition of the camera image to identify a signal region in which the traffic light exists in the camera image;

(ii) providing a plurality of color pattern filters for each color of green, yellow and red, each of the color pattern filters having a first detector, a second detector adjacent to the first detector, and a third detector adjacent to the second detector, one of the first, second and third detectors detecting pixels having one of the colors of green, yellow and red, and a remaining two of the first, second and third detectors detecting black pixels, the color pattern filters for each of the colors of green, yellow and red including at least (a) a first color pattern filter having a spatial interval with a first value between the first and second detectors and between the second and third detectors and (b) a second color pattern filter having a spatial interval with a second value different from the first value between the first and second detectors and between the second and third detectors;

(iii) generating a plurality of feature maps indicating a feature amount for an arrangement pattern of each of the green, yellow and red colors based on detections of the signal region by the detectors using at least the first and second color pattern filters for each of the colors of green, yellow and red; and (iv) determining the light color of the traffic light based on the plurality of feature maps.

13. The non-transitory computer-readable recording medium according to claim 12, wherein the green light, the yellow light and the red light are arranged in a longitudinal direction of the signal region.

14. The non-transitory computer-readable recording medium according to claim 13, wherein the plurality of feature maps are generated for a plurality of lighting states using the spatial intervals having the first and second values to detect the pixels having the colors of green, yellow and red in each of the plurality of lighting states.

15. The non-transitory computer-readable recording medium according to claim 14, the process further comprising:

among the generated feature maps, superimposing the plurality of feature maps generated using the spatial intervals having the first and second values at which colors of green, yellow and red are detected to form one feature map, and determining the light color of the traffic light based on the plurality of feature maps corresponding to the plurality of lighting states.

* * * * *